UNITED STATES PATENT OFFICE.

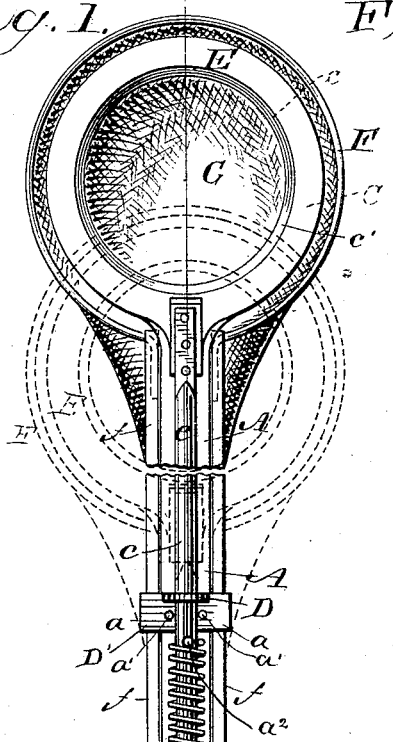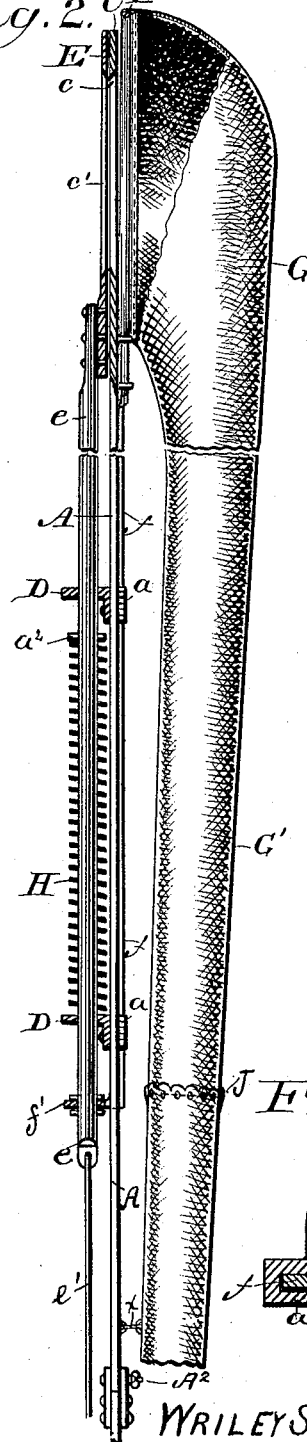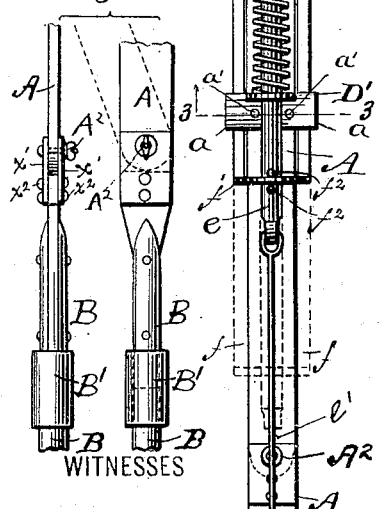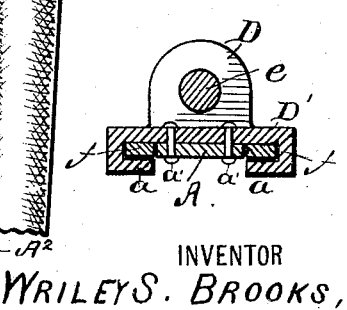

WRILEY S. BROOKS, OF BAINBRIDGE, GEORGIA.

FRUIT-GATHERER.

SPECIFICATION forming part of Letters Patent No. 397,334, dated February 5, 1889.

Application filed July 19, 1888. Serial No. 280,366. (No model.)

*To all whom it may concern:*

Be it known that I, WRILEY S. BROOKS, a citizen of the United States, residing at Bainbridge, in the county of Decatur and State of Georgia, have invented certain new and useful Improvements in Fruit-Gatherers, of which the following is a specification.

To this end my invention consists in providing a stationary and a reciprocating cutting-jaw, a bag having its mouth in close proximity to the cutting-jaws, and a chute extending to the lower end of the apparatus.

My invention also consists in combining with the stationary and reciprocating cutting-jaws a bag and chute mounted on a frame reciprocating coincidently with the reciprocating cutting-jaw.

My invention also consists in certain details of construction, hereinafter set forth.

In the accompanying drawings, Figure 1 is a front view of my improved fruit-gatherer; Fig. 2, a side view; Fig. 3, a section on the line 3 3 of Fig. 1, and Fig. 4 detail views of the manner of joining the handle-sections and adjusting them.

The frame A is provided at its lower end with a handle, B. As shown, the handle is made of a separate piece, and may be jointed at intervals, if desired, by couplings B'.

As shown in Fig. 4, the frame A is secured to the handle B by devices which permit the frame to be placed at an angle to the handle. The connection between the frame A and the handle B is preferably made, as shown in Fig. 4, by securing to the upper end of the handle plates $x'$ $x'$ by rivets $x^2$. The plates extend above the extreme upper end of the handle, and between their upper ends is secured the lower end of the frame A by means of a bolt, $A^2$, carrying an adjusting-nut. By loosening the nut the frame may be placed at any desired inclination to the handle, and then securely locked in place. On the upper end of the frame A is secured the annular cutting-jaw C, having a sharp cutting-edge, $c$, extending around its inner side. An annular cutting-jaw, E, corresponding in size to the cutting-jaw C, and placed by the side thereof, is provided with an annular cutting-edge, $c'$, on its inner side.

The cutting-jaw E is provided with a stem, $e$, which extends parallel with the frame A through guides D, formed on the guide-blocks D', which are preferably constructed as shown in Fig. 3 and secured to the frame A by rivets $a'$.

As clearly shown in Fig. 3, the guide-blocks D' are formed on each side with guides $a$, through which extend the arms $f$, that carry the annular frame or bag-holder F of the bag G. The arms $f$ lie close to the sides or edges of the frame A, and are connected at their lower ends by a cross-piece, $f'$, which extends above the frame A. The cross-piece $f'$ is connected by means of pins $f^2$ to the stem $e$, so that when the stem is moved back and forth the arms $f$, and consequently the frame F and bag G, will be moved with it. The stem $e$ carries a pull-cord, $e'$, at its lower end. The bag G is secured to the annular frame F with its mouth toward the cutting-jaws, and a chute, G', extends to the lower end of the apparatus. The chute is preferably attached to the frame at $x$, a short distance from its lower end, so that as the bag-holder is reciprocated the chute will bend and then stretch out, thus facilitating the passage of the fruit through it. The chute may be made in sections of any desired length, which may be connected together in any suitable way, as shown at J.

A spring, H, is coiled around the stem $e$, between the lower guide D and a pin, $a^2$, secured to the stem $e$ near the upper guide D, so that when the stem $e$ is drawn down and released the spring will return it to its original position.

The cutting-edges $c$ and $c'$ need not extend entirely around the annular jaws. It is sufficient to have a cutting-edge on the lower side of the jaw C and a cutting-edge on the upper side of the jaw E, so that when they come together they will act as shears to sever the fruit from the tree.

In operation the annular jaws are placed over the fruit, and the reciprocating jaw is drawn down, so as to cause the cutting-edges $c$ and $c'$ to sever the stem of the fruit, which then falls into the bag G and down into the chute G'. The stem $e$ is then released, and is thrown back by the spring H to its normal position. As the stem $e$ reciprocates, the arms $f$, annular frame F, and bag G are moved with it, so that the bag is shaken during the operation of severing the fruit, and the fruit is thus helped through the chute, instead of packing or clogging in it, as would be the case if the bag and chute were stationary.

Having thus described my invention, what I claim as new, and desire to secure by Letters Patent of the United States, is—

1. The combination, substantially as hereinbefore set forth, of the frame, the annular cutting-jaw secured thereto, the annular reciprocating cutting-jaw, and the bag-holder and bag connected with the reciprocating jaw and moving coincidently therewith.

2. The combination, substantially as hereinbefore set forth, of the frame, the handle-sections therefor, the annular cutting-jaw secured to the frame, the annular reciprocating cutting-jaw, the stem of the reciprocating jaw, the guideways on the frame in which the stem moves, the spring secured to the stem of the cutting-jaw for returning it to its normal position, the bag-holder, the bag secured thereto, the chute leading from the bag, and connections between the bag-holder and the reciprocating jaw, whereby they are caused to move coincidently.

3. The combination, substantially as hereinbefore set forth, of the frame A, the annular cutting-jaw C, secured thereto, the annular reciprocating cutting-jaw E, adjacent to the cutting-jaw C, the stem e of the cutting-jaw E, the guides secured to the frame, through which the stem extends, the spring for returning the reciprocating cutting-jaw E to its normal position, the annular frame F, the bag G, secured thereto, the chute G′, secured to the bag, the arms f, secured to the frame F, the guides a on the frame A, through which the arms f extend, and connections between the lower ends of the arms and the stem e.

In testimony whereof I have hereunto subscribed my name.

WRILEY S. BROOKS.

Witnesses:
  JNO. FLEMING,
  F. S. HARRELL.